United States Patent
Dobrawa et al.

(10) Patent No.: US 7,847,044 B2
(45) Date of Patent: Dec. 7, 2010

(54) METHOD OF PRODUCING WATER-SOLUBLE NONTURBID COPOLYMERS OF AT LEAST ONE WATER-SOLUBLE N-VINYLLACTAM AND AT LEAST ONE HYDROPHOBIC COMONOMER BY POLYMERIZATION UNDER INCREASED PRESSURE

(75) Inventors: Rainer Dobrawa, Mannheim (DE); Ralf Widmaier, Mannheim (DE); Eberhard Schupp, Grünstadt (DE); Klaus Schnell, Neustadt (DE); Karl-Hermann Strube, Speyer (DE); Ulrich Filges, Neustadt (DE); Jürgen Nieberle, Wachenheim (DE); Josef Neutzner, Neustadt (DE); Reinhold Dieing, Speyer (DE); Andreas Gruber, Altrip (DE); Wolfgang Bouquet, Deidesheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 11/643,222

(22) Filed: Dec. 21, 2006

(65) Prior Publication Data

US 2007/0149735 A1 Jun. 28, 2007

(30) Foreign Application Priority Data

Dec. 23, 2005 (DE) .................. 10 2005 062 355

(51) Int. Cl.
*C08F 26/10* (2006.01)
*C08F 218/08* (2006.01)
(52) U.S. Cl. .................. 526/264; 526/212; 526/330
(58) Field of Classification Search .............. 526/212, 526/264, 330
See application file for complete search history.

(56) References Cited

U.S. PATENT DOCUMENTS

| 3,513,142 | A | 5/1970 | Blumberg et al |
| 3,862,915 | A | 1/1975 | Fried et al. |
| 4,053,696 | A * | 10/1977 | Herrle et al. .................. 526/65 |
| 4,182,851 | A | 1/1980 | Straub et al. |
| 4,520,179 | A | 5/1985 | Barabas et al. |
| 4,554,311 | A | 11/1985 | Barabas et al. |
| 4,554,312 | A | 11/1985 | Barabas et al. |
| 5,122,582 | A | 6/1992 | Potthoff-Karl et al. |
| 5,298,554 | A | 3/1994 | Rehmer et al. |
| 5,319,041 | A | 6/1994 | Zhong et al. |
| 5,395,904 | A | 3/1995 | Zhong et al. |
| 5,502,136 | A | 3/1996 | Zhong et al. |
| 6,103,820 | A | 8/2000 | Blankenburg et al. |
| 6,369,180 | B1 | 4/2002 | Shih et al. |
| 6,512,066 | B1 | 1/2003 | Steinmetz et al. |
| 7,442,751 | B2 | 10/2008 | Dobrawa et al. |
| 7,449,531 | B2 | 11/2008 | Dobrawa et al. |
| 7,629,425 | B2 | 12/2009 | Dobrawa et al. |
| 2007/0149736 | A1 | 6/2007 | Dobrawa et al. |
| 2007/0149737 | A1 | 6/2007 | Dobrawa et al. |
| 2007/0149738 | A1 | 6/2007 | Dobrawa et al. |
| 2007/0197767 | A1 | 8/2007 | Angel et al. |

FOREIGN PATENT DOCUMENTS

| DE | 2 218 935 | 10/1973 |
| EP | 0 000 161 | 1/1979 |
| EP | 0 418 721 | 3/1991 |
| EP | 0 795 567 | 9/1997 |

OTHER PUBLICATIONS

Levenspiel, *Chemical Reaction Engineering*, (1962), Second Edition, pp. 1-7 & 125-127, John Wiley & Sons, Inc., New York.
Cheremisinoff, *Handbook of Polymer Science and Technology*, (1989), vol. 1, pp. 67-102, Marcel Dekker, Inc., New York.
Luyben, *Chemical Reactor Design and Control*, (2007), pp. 1-3 & 18-30, John Wiley & Sons, Inc., Hoboken, New Jersey.

* cited by examiner

*Primary Examiner*—Helen L. Pezzuto
(74) *Attorney, Agent, or Firm*—Connolly Bove Lodge & Hutz LLP

(57) ABSTRACT

Method of producing copolymers by free-radical polymerization of at least one water-soluble N-vinyllactam and at least one hydrophobic comonomer in an organic solvent in the presence of an initiator, where the polymerization is carried out under a gauge pressure such that evaporation of the components is avoided.

26 Claims, No Drawings

METHOD OF PRODUCING WATER-SOLUBLE NONTURBID COPOLYMERS OF AT LEAST ONE WATER-SOLUBLE N-VINYLLACTAM AND AT LEAST ONE HYDROPHOBIC COMONOMER BY POLYMERIZATION UNDER INCREASED PRESSURE

BACKGROUND OF THE INVENTION

The present invention relates to a method of producing water-soluble copolymers of at least one water-soluble N-vinyllactam and at least one hydrophobic comonomer by free-radical polymerization of the monomers in an organic solvent, and to the copolymers obtainable by the method and their use.

The production of copolymers from N-vinyllactams and hydrophobic comonomers by free-radical polymerization is known. The production of such copolymers takes place in an organic solvent, for example an alcohol or in a mixture of water and organic solvent with a high content of solvent. Usually, the polymerization is carried out under reflux of the solvent. The hydrophobic monomers that are more readily volatile compared to the N-vinyllactams pass in this way into the gas phase and into the condensate.

For many application purposes, copolymers are desired which dissolve in water to give clear solutions, i.e. the FNU value of a 5% strength by weight solution should be <20. However, there is the problem that differing reactivities and differing polarity of the monomers can lead to increases in the concentration of the hydrophobic monomers which results in homopolymers which are not water-soluble being able to be formed from the hydrophobic monomers. Even in small amounts in the range from 500 to 1000 ppm, such homopolymers lead to turbidity of an aqueous solution of the copolymers. The increases in concentration of hydrophobic monomers can arise in particular in the gas phase and in the condensate, and also on the reactor wall and the surface of the polymerization medium.

U.S. Pat. No. 5,395,904 describes the polymerization of vinylpyrrolidone and vinylacetate by controlled polymerization according to the feed method. An alcoholic solvent is used which can comprise up to 50% by weight of water.

U.S. Pat. No. 5,319,041 describes the preparation of copolymers of vinylpyrrolidone and vinyl acetate by polymerization according to the feed method with control of the polymerization temperature.

U.S. Pat. No. 5,502,136 describes a method of producing copolymers of vinylpyrrolidone and vinyl acetate according to the feed method, where the feeds are controlled via a scheme defined by specific mathematical formulae.

U.S. Pat. No. 4,520,179 and U.S. Pat. No. 4,554,311 describe the polymerization of vinylpyrrolidone and vinyl acetate with t-butyl peroxypivalate as initiator in water or water/alcohol mixtures. The initiator used therein allows the production of copolymers with a narrow molecular weight distribution, that does not lead to water-soluble products with a FNU value of <20.

EP-A 161 describes a method of producing copolymers of vinylpyrrolidone and vinyl acetate where, after the polymerization, an after polymerization with specific initiators is carried out. However, the polymers have high residual contents of vinyl acetate and are not sufficiently nonturbid.

EP-A 795 567 describes the production of copolymers of vinyllactams and hydrophobic monomers by polymerization in aqueous solution.

EP-A discloses the production of copolymers of vinylpyrrolidone and vinyl esters which dissolve in water to give clear solutions, where, at a certain point during the polymerization, a solvent exchange is carried out in order to remove volatile constituents. This method is relatively complex.

DE-A 22 18 935 describes the copolymerization of N-vinylpyrrolidone with various water-soluble and water-insoluble comonomers. Use is made here of water-insoluble initiators which are used in the form of a finely divided suspension in an aqueous solution of the copolymers. However, in the case of the water-insoluble comonomers, this does not likewise lead to the desired water-soluble copolymers with a FNU value of <20.

BRIEF SUMMARY OF THE INVENTION

The object of the present invention is therefore to provide an improved method of producing clearly water-soluble copolymers of at least one hydrophilic N-vinyllactam and at least one hydrophobic comonomer by free-radical copolymerization in an organic solvent.

According to the invention, the object is achieved by free-radical polymerization of at least one water-soluble N-vinyllactam and at least one hydrophobic comonomer in an organic solvent in the presence of an initiator, wherein the polymerization is carried out at a gauge pressure such that evaporation of the components is avoided.

DETAILED DESCRIPTION OF THE INVENTION

Suitable water-soluble vinyllactams are N-vinylpyrrolidone, N-vinylpyrrolidone methylated in the 3, 4 and 5 position, N-vinylcaprolactam, N-vinylpiperidone, N-vinylpyridone, preferably N-vinylpyrrolidone. The vinyllactams are used in amounts of from 30 to 90% by weight, preferably 50 to 90% by weight.

The method according to the invention is suitable for producing water-soluble polymers of monomer mixtures whose content of hydrophobic monomers is in the range from 10 to 70% by weight, preferably 10 to 50% by weight, based on the monomer mixture. Suitable hydrophobic monomers are those with a solubility in water in the range from 1 to 100 g/l. Suitable hydrophobic monomers are, for example, vinyl acetate, vinyl propionate, methyl acrylate, ethyl acrylate, n-propyl acrylate, n-butyl acrylate, t-butyl acrylate, methyl methacrylate, ethyl methacrylate, acrylonitrile or methacrylonitrile. The hydrophobic monomers are in particular those whose boiling points at atmospheric pressure are in the range of the polymerization temperature from 60 to 130° C., so that they could normally evaporate under polymerization conditions. Even at a boiling point slightly below the polymerization temperature, the hydrophobic monomer could pass into the gas phase with the solvent if there were adequate miscibility with the solvent. The hydrophobic monomer could here pass into the gas phase as an azeotropic mixture with the solvent or as a physical mixture with the solvent. According to the method of the invention, appropriate choice of the pressure avoids evaporation of the hydrophobic monomer. A preferred hydrophobic monomer is vinyl acetate.

Suitable initiators for the free-radical polymerization are, for example, azo compounds. Of particular suitability are aliphatic or cycloaliphatic azo compounds, such as, for example, 2,2'-azobis(isobutyronitrile), 2,2'-azobis(2-methylbutyronitrile), 2,2'-azobis(2,4-dimethylvaleronitrile), 1,1'-azobis(1-cyclohexanecarbonitrile), 2-(carbamoylazo)isobutyronitrile, 4,4'-azobis(4-cyanovaleric acid) and alkali metal and ammonium salts thereof, e.g. the sodium salt, dimethyl 2,2'-azobisisobutyrate, 2,2'-azobis[2-(2-imidazolin-2-yl) propane], 2,2'-azobis(2-amidinopropane) and the acid addition salts of the last two mentioned compounds, e.g. the dihydrochlorides. Peroxidic initiators are, for example, dibenzoyl peroxide, diacetyl peroxide, succinyl peroxide, tert-butyl perpivalate, tert-butyl 2-ethylhexanoate, tert-butyl permaleate, bis(tert-butylperoxy)cyclohexane, tert-butyl peroxyisopropylcarbonate, tert-butyl peracetate, 2,2-bis(tert-butylperoxy)butane, dicumyl peroxide, di-tert-amyl peroxide, di-tert-butyl peroxide, p-menthane hydroperoxide, pinane hydroperoxide, cumene hydroperoxide, tert-butyl hydroperoxide, hydrogen peroxide, and mixtures of the specified initiators. The specified initiators can also be used in combination with redox components such as ascorbic acid. Preferred initiators are the dialkyl peroxides.

The amount of initiator used, based on the monomers, is in the range from 0.02 to 15 mol %, preferably 0.05 to 3 mol %. In the method according to the invention, the initiator is used as solution, depending on the solubility, in an organic solvent. Preferably, the same solvent as also serves as polymerization medium is chosen. The initiators are particularly preferably used in a C1-C4-alcohol. In these solutions the initiator concentration is in the range from 0.02 to 2 mol %, preferably 0.1 to 2 mol %, based on the solvent.

A suitable polymerization medium is a polar organic solvent. The solvent must be so hydrophilic that it is miscible with the vinyllactam in any mixing ratio. Of particular suitability is a C1- to C4-alcohol, preferably ethanol or isopropanol. Particular preference is given to using isopropanol as solvent. Appropriate choice of the pressure during the polymerization reaction prevents evaporation of the solvent.

The polymerization is usually carried out at a neutral pH in the range from 5 to 9. If necessary, the pH is adjusted and/or maintained by adding a base, such as ammonia, triethylamine, triethanolamine or NaOH, or an acid, such as HCl, lactic acid, acetic acid or formic acid.

If relatively low molecular weights are desired, these can be established by adding a regulator to the polymerization mixture. Suitable regulators are, for example, aldehydes, such as formaldehyde, acetaldehyde, propionaldehyde, n-butyraldehyde and isobutyraldehyde, formic acid, ammonium formate, hydroxylammonium sulfate and hydroxylammonium phosphate. In addition, regulators can be used which comprise sulfur in organically bonded form. These are, for example, di-n-butyl sulfide, di-n-octyl sulfide, diphenyl sulfide, diisopropyl disulfide, di-n-butyl disulfide, di-n-hexyl disulfide, diacetyl disulfide and di-t-butyl trisulfide. Preferably, the regulators comprise sulfur in the form of SH groups. Examples of such regulators are n-butyl mercaptan, n-hexyl mercaptan or n-dodecyl mercaptan. Particular preference is given to water-soluble, sulfur-containing polymerization regulators, such as, for example, hydrogen sulfites, disulfites and compounds such as ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, diethanol sulfide, thiodiglycol, ethylthioethanol, thiourea and dimethyl sulfoxide. Further suitable regulators are allyl compounds, such as allyl alcohol or allyl bromide, benzyl compounds, such as benzyl chloride or alkyl halides, such as chloroform or tetrachloromethane. In a preferred embodiment, the regulator is metered into the reaction mixture, if appropriate, as a solution in a C1-C4-alcohol.

In the method according to the invention, the monomers, if appropriate as solution in a C1-C4-alcohol, are metered into the reaction mixture (feed method). In one embodiment of the invention, up to 30% by weight, preferably up to 25% by weight, of the water-soluble N-vinyllactam I (based on the total amount of N-vinyllactam I) and, if appropriate, a small amount of the initiator solution and solvent, preferably ethanol or isopropanol, are initially introduced. Then, the mixture is brought to the reaction temperature and the remaining amount of monomer is metered in continuously or in several portions at the same time as the remainder of initiator solution and, if appropriate, a regulator. In general, the metered addition takes place over a period of from 2 to 14 hours, preferably 3 to 12 hours, ideally 4 to 10 hours. The concentration of the monomers in the reaction mixture is in the range from 10 to 80% by weight, preferably 15 to 70% by weight, based on the reaction mixture. In this case, after the reaction mixture has been brought to the desired reaction temperature, the initiator solution is metered in continuously or in several portions, in particular over a period of from 2.5 to 16 hours.

The polymerization reaction is carried out under such conditions that a reflux is avoided. In this connection, this means that the liquid polymerization mixture does not boil and the readily volatile components, such as the solvent and/or the hydrophobic monomer, cannot evaporate and cannot condense again as a result of cooling. The avoidance of reflux conditions is controlled by monitoring the pressure as a function of the temperature.

The reaction temperature can be 60 to 150° C., it is usually in the range from 60 to 90° C. The reaction is carried out under protective-gas gauge pressure, where suitable protective gases are nitrogen or argon, preferably nitrogen. Here, the pressure is regulated so that the liquid polymerization mixture does not boil. The person skilled in the art can determine suitable pressure ranges using the relative vapor pressures. Usually, the pressure here will be 0.05 to 2 MPa, preferably 0.08 to 1.2 MPa, in particular 0.1 to 0.8 MPa.

The polymerization takes place in a pressure-tight boiler equipped with a stirring device. Suitable stirring devices are anchor stirrers, propeller stirrers, cross-blade stirrers. In addition, one or more feed devices for metering the monomers, the initiator solution, and, if appropriate, the regulator (solutions) are also present.

After the polymerization reaction, if desired, one or more polymerization initiators are additionally added and the polymer solution is heated, e.g. to the polymerization temperature or to temperatures above the polymerization temperature, in order to complete the polymerization. Of suitability are the azo initiators stated above, but also all other customary initiators suitable for a free-radical polymerization in alcoholic solution, for example peroxides, hydroperoxides, peroxodisulfates, percarbonates, peroxoesters and hydrogen peroxide. Through this, the polymerization reaction is conducted to a conversion of 99.9%. The solutions which form during the polymerization usually comprise 10 to 70% by weight, preferably 15 to 60% by weight, of polymer. After the polymerization, the solutions obtained can also be subjected to a physical after treatment, for example steam distillation or stripping with nitrogen, with the solvent or impurities volatile with steam being removed from the solution. In addition, the solutions may also be subjected to a chemical after-treatment or bleaching with hydrogen peroxide, sodium sulfite/tert-butyl hydroperoxide, and the like.

The aqueous solutions of the copolymer obtained by steam distillation can, if appropriate, be converted into solid powders by a drying process corresponding to the prior art. Suitable drying processes are those which are suitable for drying from aqueous solution. Preferred processes are, for example, spray-drying, spray fluidized-bed drying, drum-drying and belt-drying. Freeze-drying and freeze-concentration can likewise be used.

The polymers obtained generally have a K value (determined at 25° C. in a 1% strength by weight aqueous or ethanolic solution) in the range from 10 to 100, in particular 15 to 90 and particularly preferably 20 to 80. Determination of the K value is described in H. Fikentscher "Systematik der Cellulosen auf Grund ihrer Viskosität in Lösung" [systematics of the celluloses based on their viscosity in solution], Cellulose-Chemie 13 (1932), 58-64 and 71-74, and Encyclopedia of Chemical Technology, Vol. 21, 2nd edition, 427-428 (1970).

A measure of their clear solubility is the nephelometric turbidity unit FNU (or NTU), which is measured at 25° C. in a 5% strength by weight aqueous solution of the polymer and is fixed by calibration with formazin as artificial opacifier. The precise method is given in the course of the examples below. The polymers obtained according to the invention have a FNU value of <20, in particular <10, preferably <7 and particularly preferably <5.

The polymers obtained by the method according to the invention are used in particular in cosmetic and pharmaceutical preparations, for example as thickeners or film formers in hair lacquer additives, hair setting additives or hairspray additives, in skin cosmetic preparations, immunochemicals or as active ingredient-releasing agent in pharmaceutical preparations. In addition, the polymers produced according to the invention can be used as auxiliaries for agrochemistry, for example for seed coating or for slow-release fertilizer formulations. The polymers are also suitable as coatings for industrial applications, for example for the coating of paper or plastics, or for preparing hot-melt adhesives. Furthermore, these polymers are suitable as binders for transfer printing, as lubricant additives, as rust inhibitors or rust removers from metallic surfaces, as scale inhibitors or scale removers, as auxiliaries during the recovery of petroleum from oil-containing water, as auxiliaries during the production of petroleum and natural gas, and the transportation of petroleum and natural gas, as cleaners of waste-waters, as adhesive raw materials, as detergent additives, and as auxiliaries in the photo industry.

The examples listed below are intended to illustrate the invention without, however, limiting it.

EXAMPLES

The turbidity of the aqueous copolymer solution was determined by nephelometric turbidity measurement (modified method according to DIN 38404). In this method, the light scattered by the measurement solution is determined photometrically, light scattering being caused by the interaction between the light beams and the particles or droplets in the solution, the number and size of which constitute the degree of turbidity. The quantity being measured here is the nephelometric turbidity unit FNU (or NTU), which is measured at 25° C. in a 5% strength by weight aqueous solution of the polymer and is fixed by calibration with formazin as artificial opacifier. The higher the FNU value, the more turbid the solution.

EXAMPLES

| Feed material allocation | | Amount | Unit |
|---|---|---|---|
| Initial charge | of feed 1 | 78.4 | g |
| | of feed 2 | 3.2 | g |
| Feed 1 | isopropanol | 299.9 | g |
| | vinylpyrrolidone | 333.2 | g |
| | vinyl acetate | 266.7 | g |
| Feed 2 | isopropanol | 50.0 | g |
| | tert-butyl perpivalate 75% | 2.0 | g |
| Feed 3 | vinylpyrrolidone | 66.6 | g |
| Feed 4 | isopropanol | 50.0 | g |
| | tert-butyl perpivalate 75% | 2.0 | g | tert-butyl perpivalate: 75% in mineral oil (Trigonox ® 25)

The polymerization was carried out in a pressure-tight reactor with a volume of 2 l. The stated pressure was adjusted if necessary by injecting nitrogen. The initial charge was flushed with nitrogen for 10 min and heated. At the polymerization temperature (internal temperature) minus 10%, feeds 1 and 2 were started. Feed 1 was metered in in 5.5 h, feed 2 in 8 h. When feed 1 was complete, feed 3 was metered in in 2 h. The mixture was then after-polymerized for 1 h. When feed 2 was complete, the system was heated to an internal temperature of polymerization temperature plus 10%. Feed 4 was metered in in 4 h at this temperature. When feed 4 was complete, the mixture was after-polymerized for a further 2 h at this temperature.

| Example No. | SC % | K value | VP ppm | VAc ppm | FTU value 5% in water | Poly. temp. ° C. | Pressure in MPa | Remarks |
|---|---|---|---|---|---|---|---|---|
| a) | 48.6 | 32.8 | 89 | <10 | 53 | 75 | 0.1 | Turbid, yellowish |
| 1) | 49.6 | 31.9 | 78 | <10 | 19 | 75 | 0.13 | Clear, yellowish |
| 2) | 48.5 | 32.0 | 11 | <10 | <1 | 75 | 0.2 | Slightly yellowish, clear |
| b) | 50.2 | 29.8 | 19 | <10 | 41 | 70 | 0.1 | Yellowish, slightly turbid |
| 3) | 49.6 | 30.8 | 23 | <10 | <1 | 70 | 0.13 | Slightly yellowish, clear |
| 4) | 49.9 | 32.7 | 16 | <10 | <1 | 70 | 0.2 | Slightly yellowish, clear |
| 5) | 48.9 | 33.1 | 14 | <10 | <1 | 70 | 0.38 | Slightly yellowish, clear |
| c) | 47.6 | 31.2 | 11 | <10 | 105 | 83 | 0.1 | Yellowish, turbid |
| 6) | 45.3 | 32.2 | <10 | <10 | 8 | 83 | 0.2 | Slightly yellowish, clear |
| 7) | 49.5 | 33.7 | <10 | <10 | <1 | 83 | 0.38 | Slightly yellowish, clear |

Solids content in % by weight
K value measured 1% strength in ethanol
GC analysis: vinylpyrrolidone in ppm; vinyl acetate in ppm;
Appearance: color, clarity, FNU value
Feed time feed 1 (VP/VAc): 5.5 h
Feed time feed 2 (initiator): 8 h
Feed time feed 3 (VP): 2 h
Comparison experiments: a), b), c)

What is claimed is:

1. A method of producing copolymers, the method comprising:
   (a) providing at least one water-soluble N-vinyllactam and at least one hydrophobic comonomer; and
   (b) free-radical polymerizing the at least one water-soluble N-vinyllactam and the at least one hydrophobic comonomer in an organic solvent in the presence of an initiator, wherein the polymerization is carried out at a gauge pressure such that evaporation of the organic solvent and the at least one hydrophobic comonomer is avoided, and wherein the polymerization is carried out using the feed-method with metered addition of the at least one water-soluble N-vinyllactam and the at least one hydrophobic comonomer into the polymerization, to form the copolymers having a FNU value of less than 20.

2. The method according to claim 1, wherein the hydrophobic comonomer comprises a monomer having a solubility in water of 1 to 100 g/l.

3. The method according to claim 1, wherein the hydrophobic comonomer comprises a monomer having a boiling point at atmospheric pressure of 60 to 150° C.

4. The method according to claim 2, wherein the hydrophobic comonomer comprises a monomer having a boiling point at atmospheric pressure of 60 to 150° C.

5. The method according to claim 1, wherein the hydrophobic comonomer comprises a monomer selected from the group consisting of vinyl acetate, vinyl propionate, methyl acrylate, ethyl acrylate, n-propyl acrylate, n-butyl acrylate, t-butyl acrylate, methyl methacrylate, ethyl methacrylate, acrylonitrile, methacrylonitrile, and mixtures thereof.

6. The method according to claim 4, wherein the hydrophobic comonomer comprises a monomer selected from the group consisting of vinyl acetate, vinyl propionate, methyl acrylate, ethyl acrylate, n-propyl acrylate, n-butyl acrylate, t-butyl acrylate, methyl methacrylate, ethyl methacrylate, acrylonitrile, methacrylonitrile, and mixtures thereof.

7. The method according to claim 1, wherein the hydrophobic comonomer comprises vinyl acetate.

8. The method according to claim 4, wherein the hydrophobic comonomer comprises vinyl acetate.

9. The method according to claim 1, wherein the N-vinyllactam comprises N-vinylpyrrolidone.

10. The method according to claim 8, wherein the N-vinyllactam comprises N-vinylpyrrolidone.

11. The method according to claim 1, wherein the polymerization is carried out at a temperature of 60 to 150° C.

12. The method according to claim 10, wherein the polymerization is carried out at a temperature of 60 to 150° C.

13. The method according to claim 1, wherein the organic solvent comprises an alcohol.

14. The method according to claim 12, wherein the organic solvent comprises an alcohol.

15. The method according to claim 1, wherein the polymerization is carried out at a pressure of 0.05 to 2 MPa.

16. The method according to claim 14, wherein the polymerization is carried out at a pressure of 0.05 to 2 MPa.

17. The method according to claim 1, wherein the polymerization is carried out under a protective gas.

18. The method according to claim 16, wherein the polymerization is carried out under a protective gas.

19. The method according to claim 1, wherein the metered addition is carrier out over a period of 2 to 14 hours.

20. The method according to claim 18, wherein the metered addition is carrier out over a period of 2 to 14 hours.

21. The method according to claim 1, wherein the polymerization is carried out at a temperature of 60 to 90° C.

22. The method according to claim 10, wherein the polymerization is carried out at a temperature of 60 to 90° C.

23. The method according to claim 22, wherein the organic solvent comprises a $C_{1-4}$ alcohol.

24. The method according to claim 23, wherein the polymerization is carried out at a pressure of 0.05 to 2 MPa.

25. The method according to claim 24, wherein the polymerization is carried out under a protective gas.

26. The method according to claim 25, wherein the metered addition is carrier out over a period of 2 to 14 hours.

* * * * *